March 9, 1937.     F. R. DIETRICH     2,072,849
SEARCHLIGHT WITH ELLIPSOID MIRROR
Filed Jan. 25, 1935
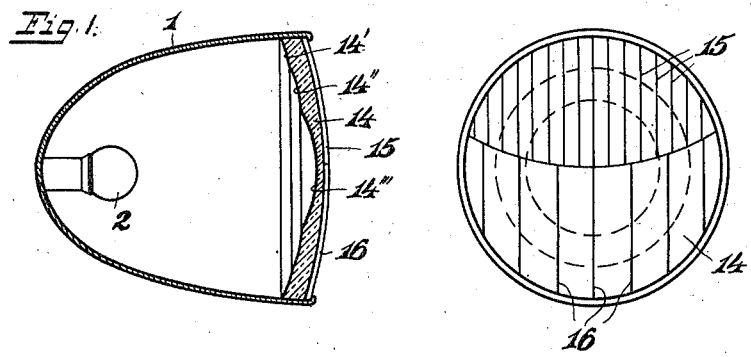
Friedrich Richard Dietrich
INVENTOR
his ATTY.

Patented Mar. 9, 1937

2,072,849

UNITED STATES PATENT OFFICE 2,072,849

SEARCHLIGHT WITH ELLIPSOID MIRROR

Friedrich Richard Dietrich, Pasing, near Munich, Germany

Application January 25, 1935, Serial No. 3,416
In Germany January 25, 1934

1 Claim. (Cl. 240—41.3)

My invention relates to a search-light having an ellipsoidal reflector, particularly adapted for use in motor vehicles.

As compared with paraboloid reflectors, ellipsoid reflectors distinguish themselves by a considerably greater utilization of angle of space, without, however, producing a concentrated long distance light.

My present device produces a suitable light by means of an ellipsoid reflector and utilizes the angle of space determined by the ellipsoidal shape. In accordance with my invention, I make use of a lens system consisting of at least two lens portions of different optic effect.

The embodiment herein chosen for illustration is characterized by the arrangement of a dispersing lens directly across the open end of a reflector of semi-ellipsoidal shape, the lens having substantially the same diameter as said open end, and provided on one face with cylindrical flutes.

In the drawing,

Figure 1 is a vertical cross-sectional view through a search-light of the present character; and Figure 2 is a front view of the lens of Figure 1.

The device comprises a reflector or mirror 1 of semi-ellipsoidal shape, with a lamp or other source of light 2 mounted therein at the focus of the ellipsoid. A lens 14, having substantially the same diameter as the forward or open end of the semi-ellipsoid, is arranged across said end. It has a slightly convex outer face, and its inner face is subdivided into concentric concave portions which define zones of correction 14', 14", and 14'''. These zones are convenient because every ray reflected by the mirror 1 falls upon the inner surface of the lens 14 at a different angle, and it would be impossible to obtain a theoretically faultless parallel beam by means of a lens having only a single radius of curvature. The individual zones of correction 14', 14", and 14''' differ from one another by their various radii of curvature.

By means of the lens 14 an approximately parallel bean of light is produced. In order to provide also for the necessary side illumination, the lens 14 is provided on its outer surface with cylindrical flutes 15 and 16. These flutes are arranged vertically, the flutes 16 being of relatively large radius of curvature and occupying the lower part of the lens, the flutes 15 being of smaller radius of curvature and occupying the upper part. The flutes 15 thus spread the light laterally to a greater degree than do the flutes 16.

If desired, the upper portion of the lens, occupied by the flutes 15, may be colored yellow, so that only a yellow illumination is produced when the device is dimmed, e. g., by means of a screen arranged below a second filament of the lamp 2.

Since the lens 14 is a dispersing lens, the rays reaching it directly from the lamp 2 are dispersed, the center zone 14''' having a slighter dispersing effect and the concentric zones 14" and 14' having correspondingly greater dispersing effects. At the same time, those rays which reach the zone 14''' by reflection from the mirror 1 are caused to be deflected into a substantially forward direction. The result is that I obtain not only a far-reaching, concentrated, long-distance beam, but also a strong and far-reaching side illumination.

What I claim is:

A searchlight comprising a semi-ellipsoid mirror, a source of light at the focus thereof, and a concavo-convex lens secured to the mirror around the opening of the semi-ellipsoid and of substantially the same diameter as said opening, the concave face of said lens having concentric zones of correction of different radii of curvature and the convex face of said lens having groups of cylindrical flutes, the flutes in one group having a different radius of curvature from the flutes in another group.

FRIEDRICH RICHARD DIETRICH.